United States Patent
Jacobsen et al.

(10) Patent No.: US 9,705,919 B1
(45) Date of Patent: *Jul. 11, 2017

(54) SECURITY POLICY ENFORCEMENT FOR MOBILE DEVICES BASED ON DEVICE STATE

(71) Applicant: Palo Alto Networks, Inc., Santa Clara, CA (US)

(72) Inventors: Michael Soren Jacobsen, Mountain View, CA (US); Joby Menon, Cupertino, CA (US); Song Wang, Palo Alto, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 584 days.

This patent is subject to a terminal disclaimer.

(21) Appl. No.: 13/954,655

(22) Filed: Jul. 30, 2013

Related U.S. Application Data

(60) Provisional application No. 61/845,797, filed on Jul. 12, 2013.

(51) Int. Cl.
*H04L 29/06* (2006.01)

(52) U.S. Cl.
CPC ............ *H04L 63/20* (2013.01); *H04L 63/102* (2013.01)

(58) Field of Classification Search
CPC ....... H04L 63/10; H04L 63/102; H04L 63/20; H04W 12/08
See application file for complete search history.

(56) References Cited

U.S. PATENT DOCUMENTS

| | | |
|---|---|---|
| 8,099,784 B1 | 1/2012 | Chen et al. |
| 8,220,054 B1 | 7/2012 | Lu |
| 9,351,167 B1 | 5/2016 | Adams |
| 9,389,992 B2 | 7/2016 | Gataullin et al. |
| 2003/0081621 A1 | 5/2003 | Godfrey et al. |
| 2008/0109679 A1* | 5/2008 | Wright ............... H04L 63/102 714/37 |
| 2008/0137593 A1* | 6/2008 | Laudermilch ........ H04W 48/02 370/328 |
| 2010/0064341 A1* | 3/2010 | Aldera ................ H04L 63/102 726/1 |
| 2010/0333168 A1 | 12/2010 | Herrod |
| 2012/0036220 A1 | 2/2012 | Dare et al. |
| 2012/0110174 A1 | 5/2012 | Wootton et al. |
| 2012/0129503 A1 | 5/2012 | Lindeman et al. |
| 2012/0240183 A1 | 9/2012 | Sinha |

(Continued)

OTHER PUBLICATIONS

Steve Mastrianni, Leveraging Cloud for Enterprise Mobile Services Delivery, 2013 IEEE International Conference on Cloud Engineering, Mar. 25-27, 2013.

*Primary Examiner* — Minh Dinh
(74) *Attorney, Agent, or Firm* — Van Pelt, Yi & James LLP

(57) ABSTRACT

Techniques for network-based security for mobile devices based on device state are disclosed. In some embodiments, network-based security for mobile devices based on device state includes receiving a Host Information Profile (HIP) report for a mobile device from a mobile device management (MDM) service at the security device, in which the HIP report includes device state information for the mobile device; applying a policy based on the HIP report for the mobile device and the device state; and performing access control at the security device based on the policy based on the HIP report for the mobile device.

21 Claims, 8 Drawing Sheets

(56) References Cited

U.S. PATENT DOCUMENTS

| | | |
|---|---|---|
| 2012/0311659 A1 | 12/2012 | Narain et al. |
| 2013/0007245 A1 | 1/2013 | Malik et al. |
| 2013/0074186 A1 | 3/2013 | Muttik |
| 2013/0097660 A1 | 4/2013 | Das et al. |
| 2013/0227636 A1 | 8/2013 | Bettini et al. |
| 2014/0007182 A1 | 1/2014 | Qureshi et al. |
| 2014/0208425 A1 | 7/2014 | Palomaki |
| 2014/0214610 A1 | 7/2014 | Moshir et al. |
| 2014/0274172 A1 | 9/2014 | Ludwig et al. |
| 2014/0373095 A1 | 12/2014 | Yoon et al. |

* cited by examiner

300

| | |
|---|---|
| Report Generated | 07/09/2013 12:08:29 |
| User Information | User: jmenon  IP Address: 10.31.32.6 |
| Host Information | Machine Name: Joby%27s+iPod+touch-440884965180 Domain: |
| OS | Apple iOS 6.1.3 |
| Client Version | 2.0.0-40 |
| WiFi SSID | corp-wifi |
| Network Information | Interface: en0  MAC Address: 44:D8:84:96:51:B0  IP Address: fe80::46d8:84ff:fe96:51b0  10.20.0.92 |

Mobile Device

| Last Check In Time | Enrollment Time | Location | Tags |
|---|---|---|---|
| | 2013/07/09 12:08:54 | 0, 0 | testtags |

| Managed | Rooted/Jailbroken | Disk Encryption Not Set | Passcode Not Set | Has Malware |
|---|---|---|---|---|
| no | | | | |

| Device Model | Phone Number | | |
|---|---|---|---|
| iPod touch 4 | | | |
| Serial Number | IMEI | ICCID | MEID |
| C8HG8FJDNQW | | | |

| Name | Identifier |
|---|---|
| GP MDM BETA CA | 8e6b7e426adce17947c186e4f6963d1592b49e05a |
| GlobalProtect MDM Profile | Palo Alto Networks.mobileconfig.profileservice |
| Passcode Policy | com.mdmbeta.pwd |

SECURITY POLICY ENFORCEMENT FOR MOBILE DEVICES BASED ON DEVICE STATE

CROSS REFERENCE TO OTHER APPLICATIONS

This application claims priority to U.S. Provisional Patent Application No. 61/845,797 entitled SECURITY POLICY ENFORCEMENT FOR MOBILE DEVICES BASED ON DEVICE STATE, filed Jul. 12, 2013, which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIGS. 3A and 3B are screen shots that illustrate example Host Information Profile (HIP) reports for a mobile device in accordance with some embodiments.

DETAILED DESCRIPTION

Figure 1:
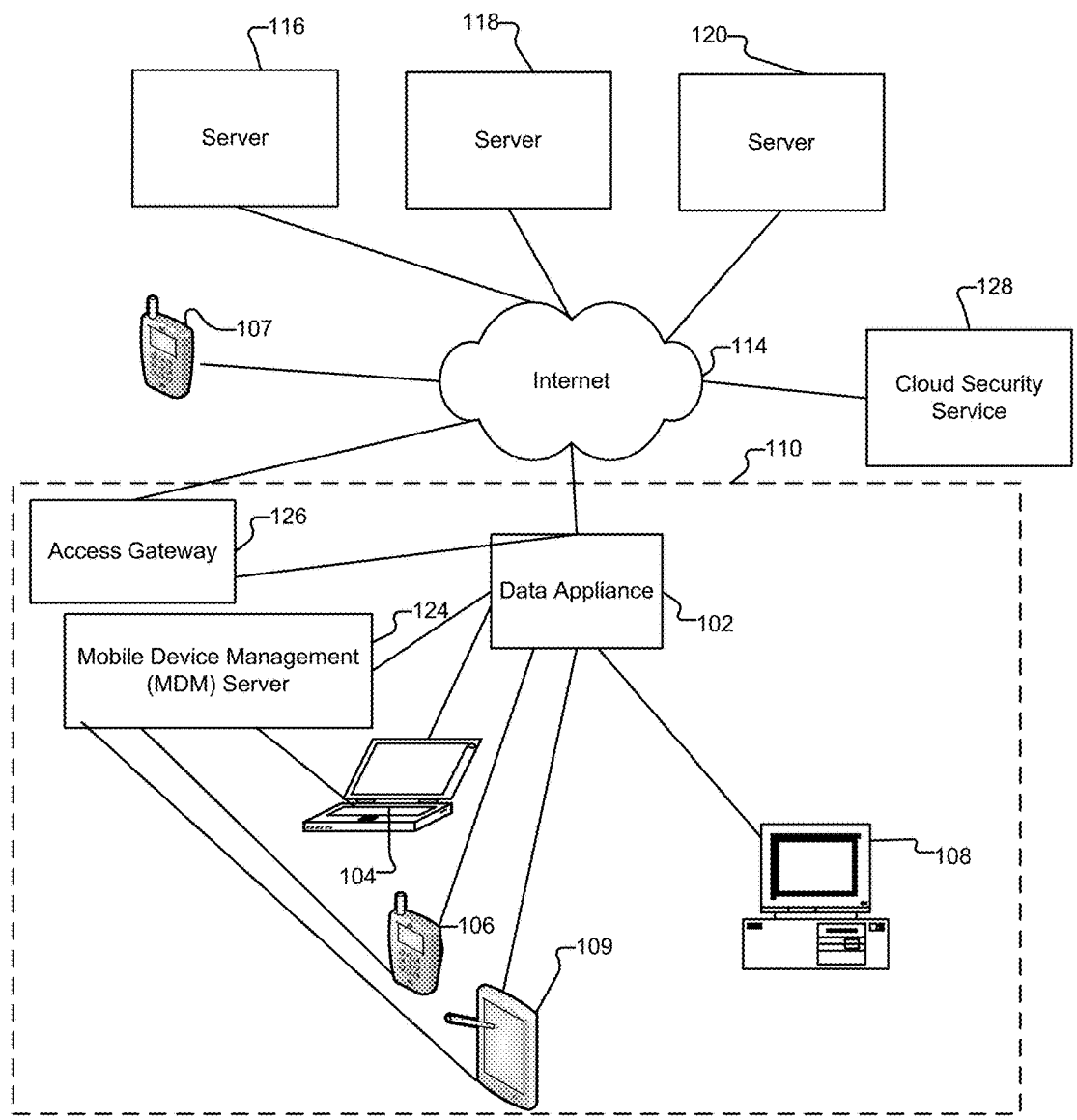
FIG. 1 is a block diagram of a network architecture that can be used for network-based security for mobile devices based on device state in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, and intrusion prevention/detection, proxy, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information. Advanced firewalls can also perform security functions based on application, user, and/or content identification related functions.

In addition, mobile devices (e.g., iOS, Android, and other mobile-based platform devices) are gaining in popularity. For example, approximately 340 million iOS and Android-based platform mobile devices were sold in calendar year 2011. Unlike personal computers, mobile devices were originally targeted as devices for consumers, but such mobile devices are now finding their way into enterprises. For example, employees of companies are increasingly using smart phones and tablets for their work related activities. This trend presents significant challenges for enterprises to support these mobile devices as business tools. The platform/device diversity, rate of change, and many new mobile device capabilities changing how people work add to the complexity of these challenges for enterprises. However, traditional security tools are built for personal computers and generally are not designed for these new mobile device platforms and new mobile devices.

Thus, what are needed are new and improved security techniques for policy enforcement for mobile devices. Accordingly, in some embodiments, various network-based security techniques are disclosed herein for mobile devices.

In addition, current firewalls typically enforce based on network protocol and destination port number. As a result, such firewalls generally allow any traffic that tunneled through an enterprise gateway as long as well-known ports are used, such as port 80 or port 443. Also, current firewalls do not fully protect devices communicating through the firewall by determining client device specific information and enforcing policies based on the client device specific information (e.g., device state related information). For example, whether or not a client device, such as a mobile device is executing up to date security software, has installed apps (e.g., mobile apps for such mobile devices are commonly referred to as apps) that are determined to be malware or otherwise violate an enterprise policy, and/or other device state related information can be used as a criteria in determining whether to allow the device to access an untrusted zone (e.g., download certain types of files from a web site) or whether or not to allow the device to access certain enterprise resources (e.g., confidential enterprise information, such as a source code repository, a financial database, an enterprise network, and/or other enterprise resources).

For example, using various techniques described herein can allow an enterprise to support app usage on mobile devices while maintaining the enterprise's policy for security (e.g., security policy). In some embodiments, such a mobile security solution includes using an access gateway and/or a data appliance (e.g., a security appliance) to implement various techniques described herein.

For example, an access gateway (e.g., that provides for VPN access to an enterprise network, such as for mobile devices) can be used as a network security enforcement point to implement various techniques described herein. The VPN connection can be used to monitor traffic and provide policy enforcement based on device state of mobile devices using various techniques described herein. Also, a cloud security service can be provided to analyze mobile apps and to identify malicious or potentially malicious applications to help thwart such malware from accessing the enterprise network.

As another example, a data appliance (e.g., that provides a security function, including a firewall, for an enterprise network, including for mobile devices that are accessing the enterprise network) can be used as a network security enforcement point to implement various techniques described herein. The data appliance can be used to monitor traffic and provide policy enforcement based on the device state of mobile devices using various techniques described herein. Also, a cloud security service can be provided to analyze mobile apps and to identify malicious or potentially malicious applications to help thwart such malware from accessing the enterprise network.

In particular, policy enforcement using host profile information for mobile devices is provided using various techniques described herein, which is also referred to herein as a host information profile (HIP) (e.g., a HIP report), for mobile devices. In some embodiments, from the gateway/appliance side, the term host information profile (e.g., or HIP profile) refers to administration configured device profiles that can be used to match against HIP reports received from one or more client devices, such as mobile devices. In some embodiments, a mobile device management (MDM) server (e.g., an MDM appliance and/or other appliances/servers that provide an MDM service) is provided to manage and configure mobile devices (e.g., for an enterprise). In some embodiments, the MDM server collects Host Information Profile (HIP) data from mobile devices. In some embodiments, the MDM server also collects and/or receives mobile app related analysis data from the cloud security service (e.g., a list of malware apps), and compiles this information to create HIP reports. For example, such HIP reports can be provided to one or more access gateways as well as the MDM server(s) for implementing HIP-based policies (e.g., enforcing a security policy using HIP information for mobile devices).

In some embodiments, automatically configuring mobile devices and applying policy based on device state (e.g., HIP report related information) is disclosed. In some embodiments, network-based security for mobile devices based on device state includes receiving a Host Information Profile (HIP) report for a mobile device (e.g., from an MDM service); performing a policy match based on the HIP report for the mobile device; and performing an action based on the policy match based on the HIP report for the mobile device. In some embodiments, automatically configuring mobile devices and applying policy based on device state further includes receiving a list of known malware and application characteristics from an external service. For example, the policy match can be determined based on a user/group match and/or a device match. An example action can include performing a configuration option (e.g., to remove/uninstall a malware app, enable disk encryption, lock or unlock the mobile device, wipe the mobile device, and/or some other action based on a policy match).

In some embodiments, network-based security for mobile devices based on device state includes receiving a Host Information Profile (HIP) report for a mobile device from a mobile device management (MDM) service at the security device, in which the HIP report includes device state information for the mobile device; applying a policy based on the HIP report for the mobile device and the device state; and performing access control at the security device based on the policy based on the HIP report for the mobile device state. For example, the action can be an access control related action performed by an access gateway and/or security device (e.g., a firewall appliance) to control access to enterprise network resources.

For example, the MDM service can be configured to allow admins (e.g., IT/network/security administrators) to configure policies and device settings for mobile devices that access or attempt to access an enterprise network. For example, the MDM server can be configured to provide automated configuration of mobile devices and to further provide granular control of the configuration deployment based on a device state of the mobile device. In some cases, the MDM service can also receive a list of bad apps (e.g., malicious or potentially malicious apps, also sometimes referred to herein as malware apps) periodically from the cloud security service. For example, the list of malware apps can be used to match the device state (e.g., to determine if any apps installed on the mobile device are present on the malware apps list) and apply policies as further described herein. As an example, if disk encryption is not enabled on a mobile device, then the mobile device can be denied access to the enterprise network (e.g., the access/VPN gateway can deny a VPN connection with the mobile device, such as by removing a required certificate using the MDM server to configure the mobile device, to prevent the mobile device from accessing enterprise data using a device that is not secured with disk encryption). As another example, if a mobile device is determined to have a malicious app installed, malware is detected on the mobile device, and/or the mobile device is determined to be otherwise potentially compromised (e.g., rooted or jail broken, or other mobile device configuration policy violations are detected), then a responsive action can be performed (e.g., enterprise Wi-Fi settings can be removed from the mobile device and/or some other action can be performed using the MDM service to configure the mobile device). Accordingly, using various techniques described herein, mobile devices can be automatically configured and policies can be applied based on device state (e.g., HIP report related information) of such mobile devices.

Generally, a HIP report is a report that includes various information about a device (e.g., a client device, such as a mobile device, which can be a laptop, tablet, smart phone, or any other type of network capable mobile device). In some embodiments, from the client device side, a HIP report refers to data that includes information about the client device (e.g., in an XML file or data in another format) and that is sent from the client device to another device (e.g., HIP information for the client device can be reported to a security gateway/appliance/server and/or to an MDM service). For example, a HIP report for a mobile device can include information indicating the type of mobile device, including certain hardware information (e.g., type of device, model information, device identification (ID) information, processor, and/or other hardware related information), information regarding software installed on the device (e.g., operating system and patch level, security application software and status of data files, such as for signature updates, current status information, such as the last date/time a full antivirus scan was performed, and/or current settings information, such as whether or not auto protect antivirus software is enabled or disabled), information regarding currently installed and/or executing software on the device (e.g., a list of apps that are installed on a mobile device and/or a list of apps that are executing on the mobile device), and/or configuration information of the mobile device (e.g., disk encryption enabled, passcode enabled, camera enabled, location settings, and/or other configuration related information).

For example, a smart phone or tablet (e.g., or another type of mobile device) can be configured to periodically send a HIP report indicating that the mobile device includes the following example information: all critical patches are installed; security (e.g., antivirus) software is installed and currently executing; and which mobile device operating system platform is installed and executing. From a gateway side, an admin can configure two host information profiles (e.g., HIP profiles), such as a good-smart phone HIP profile and an excellent-smart phone HIP profile. The good-smart phone HIP profile definition can require, for example, that the smart phone has any antivirus installed and executing. The excellent-smart phone HIP profile definition can require, for example, that the smart phone has AV-Security Company's antivirus installed and executing; iOS version X or Android version Y installed and executing; and all critical updates installed. Any HIP report received by the gateway (e.g., an access gateway for accessing an enterprise network for the enterprise) can be compared with all HIP profiles to see which (if any) HIP profiles match such HIP reports. Rules (e.g., for policy enforcement and/or reporting) can be applied based on HIP profile matches along with other information (e.g., user and/or application identification, along with other information, such as protocol and source/destination port and IP address information, and perform an action, such as allow, deny, and/or report). While HIP reports have been used for security vulnerability assessment and/or remediation based on security vulnerability assessment, using HIP reports for improving enterprise network security for mobile device access is needed. Accordingly, various techniques for using HIP reports for improving enterprise network security for mobile device access are disclosed herein with respect to various embodiments.

In some embodiments, policy enforcement based on device state for mobile devices is disclosed. In some embodiments, policy enforcement for mobile devices using host profile information includes receiving a host information profile (HIP) report from a mobile device (e.g., received from the mobile device using an agent/function executed on the client device and/or indirectly using an intermediary device/function that collects, aggregates, and/or forwards HIP reports from the mobile device and/or other mobile devices), in which the host information profile report includes device profile information associated with the mobile device; and enforcing a security policy for network access based on the host information profile report. For example, policy enforcement (e.g., firewall policy enforcement) can include one or more HIP profiles as a match criteria to match with HIP reports, which can allow, for example, for complex policies based on various host conditions. As another example, policy enforcement can be based on application identification, user identification, and a host information profile that matches a host information profile (HIP) report.

For example, an access/VPN gateway can receive device state for mobile device's state (e.g., HIP Reports for mobile devices) from an MDM service (e.g., using an MDM server(s)) and enforce a policy (e.g., security policy, such as an access/firewall policy) based on the device state information. In some implementations, the MDM service is a third party MDM service that communicates with an access/VPN gateway using a network protocol that is made available to third party MDM vendors. For example, the security policy can restrict access to enterprise network resources for mobile devices based on device state information (e.g., if disk encryption is not enabled on a mobile device, then the mobile device is denied access to company confidential information, such as company financial information, but external Internet access may be allowed; if malware is detected on the mobile device, then access to the enterprise network can be denied; and/or if the mobile device is determined to have a configuration profile that is not compliant with an enterprise policy, then an action can be performed based on a policy). Accordingly, a policy (e.g., a security policy) can be enforced against mobile devices based on device state information using various techniques described herein.

In some embodiments, policy enforcement based on device state for mobile devices further includes determining the security policy based on a host information profile that matches the host information profile (HIP) report, an identified application, and an identified user name. For example, a gateway, a data appliance, or software executing on a device can enforce a security policy based on user name or user group, application, and host information profile (HIP) report sent from a mobile device. Various advanced firewall techniques described herein can utilize a user name (e.g., an actual user name that logged into the client device), an application (e.g., the application used for/associated with the network traffic flow), and the host information profile (HIP) report (e.g., a current HIP report received from the client device) to determine if the network traffic flow should be allowed to pass through the firewall (e.g., executing on a data/security appliance and/or an access gateway). Thus, the various firewall techniques described herein can use this additional information as criteria for rules or policies for network access/communications (e.g., firewall rules and firewall policies).

In some embodiments, in addition to using the APP-ID engine to identify the application being used (e.g., web browsing, voice over IP (VOIP), or communicating to a social networking site) and the user name associated with an IP address of the user's client device, a HIP report for the client device is also used in determining whether to allow or deny the mobile device traffic. In some embodiments, a HIP report is an XML file that includes information about the mobile device (e.g., IP address, user name, domain, security software and data file status for current signature updates, operating system (OS) type and version, OS patch level, encryption enabled status, register information, installed app information, and/or other hardware, software, and/or configuration information regarding the mobile device). For example, certain network access can be limited or restricted based on an application identification, a user name, and a HIP report (e.g., that matches one or more host information profiles).

In some embodiments, the security policy includes a firewall rule (e.g., inbound and/or outbound firewall rule). In some embodiments, the security policy includes a network access rule.

In some embodiments, the system includes a gateway device. In some embodiments, the system includes a data appliance (e.g., security appliance or security server). In some embodiments, the system includes a network routing device (e.g., a network router). In some embodiments, the system includes a programmed general purpose computer (e.g., a programmed computer, laptop, tablet, or smart phone, or another type of a network capable device with a general purpose processor that can execute security software). In some embodiments, the system includes an MDM service (e.g., one or more MDM servers/appliances) that facilitates collecting and forwarding device state information for mobile devices and/or for managing and configuring mobile devices for an enterprise.

In some embodiments, the host information profile report includes device hardware information. In some embodiments, the host information profile report includes device software information. In some embodiments, the host information profile report includes device software information, in which the device software information includes an oper-
ating system identifier, an operating system patch level, and security applications and security data file levels. In some embodiments, the host information profile report includes device software information, in which the device software information includes remediation information. In some embodiments, the host information profile report includes device software information, in which the device software information includes information identifying a list of apps installed on the device (e.g., and possibly the update status information for such installed apps). In some embodiments, the host information profile report includes device configuration information, in which the device configuration information includes various device configuration settings (e.g., whether disk encryption is enabled on the device and/or whether a passcode is enabled on the device). In some embodiments, the host information profile report includes device location information, in which the device location information includes information for identifying whether the mobile device is in a trusted zone or an untrusted zone. In some embodiments, the host information profile report includes device authorization information, in which the device authorization information includes information for identifying whether the mobile device is authorized for access to an enterprise network (e.g., a corporate network, a government entity's network, and/or an organization's/entity's network). Similarly, admins (e.g., network or security administrators) can configure host information profiles based on any or all of the above information/criteria that can be included in host information profile reports, such as further described herein with respect to various embodiments.

In some embodiments, the host information profile report is generated by an agent (e.g., a HIP agent) executed on a mobile device, and in which the host information profile report is periodically reported from the mobile device. For example, the agent can be provided as an app (e.g., an MDM service app, also referred to herein as an MDM app) that can be installed on the mobile device for periodically generating HIP reports for the mobile device.

In some embodiments, policy enforcement using HIP information includes matching the HIP report from the mobile device with one or more host information profiles, in which the one or more host information profiles are configured by an admin. In some embodiments, policy enforcement using HIP information includes determining the security policy based on a HIP that matches the HIP report, and an identified application. In some embodiments, policy enforcement using host profile information includes determining the security policy based on a HIP that matches the HIP report, and an identified user name. In some embodiments, policy enforcement using host profile information includes determining the security policy based on a HIP that matches the HIP report, an identified application, and an identified user name.

In some embodiments, policy enforcement using HIP information includes receiving HIP reports from each of a plurality of mobile devices.

In some embodiments, policy enforcement using HIP information includes denying access permission to an enterprise resource (e.g., restricted enterprise information or resources, such as a source code repository, a financial database, enterprise Wi-Fi, enterprise e-mail, enterprise intranet, and/or any other enterprise resource(s)) based on the HIP report, in which the HIP report indicates that the mobile device is a potentially insecure and/or non-compliant mobile device based on a policy and device status information for the mobile device.

In some embodiments, a gateway for policy enforcement using HIP information includes establishing a secure connection between a gateway (e.g., an access/VPN gateway) and a mobile device, in which the mobile device is located outside of an enterprise secured network, and in which the gateway is an enterprise gateway that is located within the enterprise secured network; receiving a HIP report for the mobile device, in which the HIP report includes device profile information associated with the mobile device (e.g., received from the mobile device or received from an MDM service that collects/receives device status reports including HIP reports for enrolled mobile devices for the enterprise); and enforcing a policy for network access based (e.g., an access policy or security policy) on the HIP report for the mobile device.

For example, if Alice works for ACME Company and attempts to access the ACME Company enterprise network using a VPN connection from her smartphone (e.g., an Android-based smartphone), then Alice can be required to install an app from the Google Play Store that provides HIP reporting functionality to automatically report device status to an MDM service for the enterprise. If Alice's device is determined to be compliant based on the reported device status and mobile device policy for the ACME Company, then the VPN connection can be allowed by the VPN gateway. However, if Alice's device is determined to be non-compliant, then a responsive action can be performed based on the policy (e.g., the VPN connection can be denied, limited access can be provided, a configuration change on Alice's device can be performed or requested, and/or some other action(s) based on a policy).

As another example, if Bob also works for ACME Company and attempts to access the ACME Company enterprise network using a VPN connection from his tablet (e.g., an Android-based tablet), then Bob can be required to install an app from the Google Play Store that provides HIP reporting functionality to automatically report device status to an MDM server for the enterprise. If Bob's device is determined to be compliant based on the reported device status and mobile device policy for the ACME Company, then the VPN connection can be allowed by the VPN gateway. However, if Bob's device is determined to be non-compliant based on having one or more malware apps installed on the device, then a responsive action can be performed based on the policy (e.g., the VPN connection can be denied, limited access can be provided, a configuration change on Bob's device can be automatically performed to remove the malware apps, a warning message can be provided to Bob that access will be denied or limited until Bob removes/uninstalls the malware apps with a listing of such malware apps, and/or some other action(s) based on a policy).

These and other examples are further described herein with respect to various embodiments.

FIG. 1 is a block diagram of a network architecture that can be used for network-based security for mobile devices based on device state in accordance with some embodiments. As shown, a data appliance 102 (e.g., a data appliance that includes security functions, such as a security appliance/device that includes a firewall, a gateway that includes security functions, such as an access/VPN gateway or security gateway, and/or any other device that includes a firewall function as described herein) is at the perimeter of a protected network 110, which includes clients 104, 106, 108, and 109 (e.g., desktop computers, and can also include mobile devices, such as smart phones, tablets, laptops, and/or other types of mobile devices). For example, client devices 104, 106, 108, and 109 can include various computing devices that can access the Internet via wired and/or wireless communications, such as computer, laptops, tablets, smart phones, and/or various other types of computing devices with network communication capabilities. As an example, a client device can access a service provided by a server via the Internet, such as a web related service (e.g., website, cloud based services, streaming services, or email service), peer-to-peer related service (e.g., file sharing), IRC service (e.g., chat service), and/or any other service that can be delivered via the Internet.

As also shown, a mobile device management (MDM) server 124 is in communication with data appliance 102. For example, MDM server 124 communicates with mobile devices to determine device status of each of the mobile devices and to report (e.g., periodically) such mobile device status information to data appliance 102 using various techniques disclosed herein. As also shown, each of the mobile devices 104, 106, and 109 is also in communication with MDM server 124.

In some embodiments, data appliance 102 includes an appliance (e.g., a security appliance), a gateway (e.g., a security gateway or access gateway), a server (e.g., a server that executes security software including firewall), and/or some other security device, which, for example, can be implemented using computing hardware, software, or various combinations thereof. In some embodiments, the firewall performs some or all of the functions described herein. In some embodiments, data appliance 102 includes a firewall function (e.g., executes a firewall) to protect the network and clients within the protected network 110, which is in communication with the Internet 114 and various remote servers, such as servers 116, 118, and 120 (e.g., web servers, mail servers, file servers, and/or other types of servers, which, for example, clients may attempt to connect to using secure protocols).

In some embodiments, an access gateway 126 (e.g., access/VPN gateway, which can be implemented on a separate device from data appliance 102 or implemented as part of data appliance 102) is provided as shown in communication with data appliance 102. For example, a mobile device 107 (e.g., a smart phone or another mobile device) can attempt to access enterprise network 110 via the Internet 114 by attempting to establish a connection (e.g., a VPN connection) with access gateway 126. In some embodiments, MDM server 124 communicates with access gateway 126 (e.g., an access gateway that can provide VPN access to the enterprise network). For example, access gateway 126 can receive device status information (e.g., HIP related information) from the mobile device and/or from an MDM service (e.g., MDM server 124). In particular, one or more mobile devices can attempt to access enterprise network 110 using access gateway 126 using various techniques as further described herein with respect to various embodiments. The access gateway 126 can receive device state information (e.g., HIP reports) from the MDM server 124 and can be configured with a policy (e.g., that uses device state information for access control). These and other examples for using the various techniques described herein to facilitate secure access control to enterprise resources using an MDM server and an access gateway are further described below with respect to various embodiments.

In some embodiments, some or all of the firewall related functions described herein can be assisted by or implemented in whole or in part by cloud security service 126. Cloud security service 128 can, for example, reduce the processing on data appliance 102. As an example, detection of security policy violations and/or vulnerabilities based on techniques described herein can be reported to cloud security service 128 by data appliance 102. As another example, cloud security service 128 can report malware apps to data appliance 102, to MDM server 124, and/or to access gateway 126 using various techniques described herein. As yet another example, cloud security service 128 can report mobile device policy violations based on device status to data appliance 102, to MDM server 124, and/or to access gateway 126 using various techniques described herein.

Mobile Device Enrollment Process

Figure 2A:
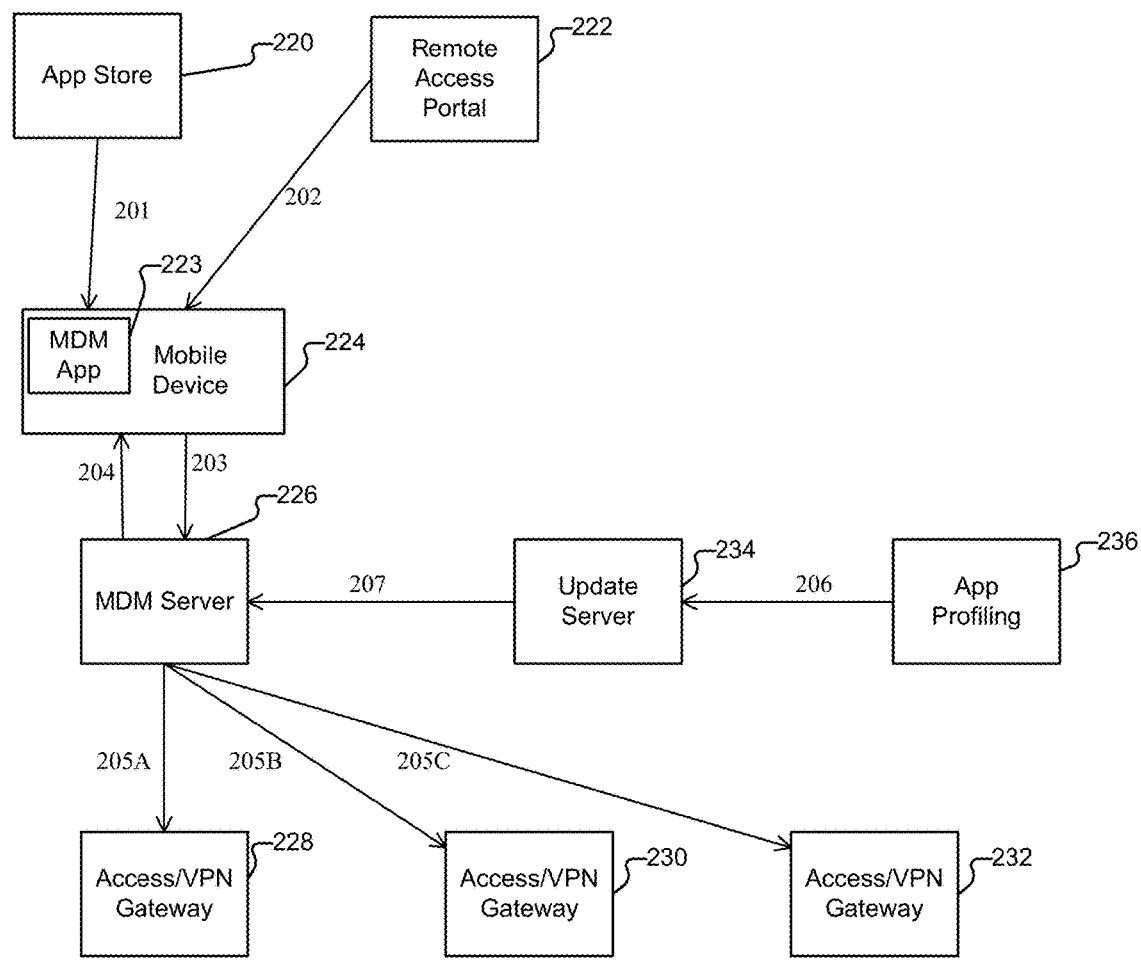
FIG. 2A is a functional diagram of a network architecture for providing a mobile device enrollment in accordance with some embodiments.

FIG. 2A is a functional diagram of a network architecture for providing a mobile device enrollment in accordance with some embodiments. At 201, a mobile device 224 can download (201) an MDM app 223 (e.g., an app that can report device status of the mobile device to an MDM service and/or facilitate remote device configuration of the mobile device using the MDM service) from a mobile device app store 220 (e.g., Apple App Store for iOS mobile devices, Google Play Store for Android mobile devices, and/or other mobile device app stores). At 202, MDM app 223 connects to a remote access portal 222, and remote access portal 222 sends a configuration file to MDM app 223. At 203, MDM app 223 communicates with an MDM server 226 to enroll mobile device 224 with MDM server 226 (e.g., which provides an MDM service for the enterprise, and MDM app 223 also sends device state information (e.g., a HIP report for the mobile device) to MDM server 226. At 204, MDM app 223 receives a policy from MDM server 226.

At 205A-C, MDM server 226 sends mobile device state information (e.g., HIP reports for mobile devices) to access/VPN gateways 228, 230, and 232 (e.g., which can use the mobile device state information for applying security policies for determining access control for such mobile devices using various techniques as described herein). In some embodiments, MDM server 226 sends mobile device state information (e.g., HIP reports for mobile devices) to a data appliance (e.g., a data appliance 102 of FIG. 1, that can provide a security device, such as a firewall for the enterprise network, and/or an access/VPN gateway for the enterprise network, and which can use the mobile device state information for applying security policies for determining access control for such mobile devices using various techniques as described herein).

At 206, malware app information (e.g., a listing(s) of apps determined to be malicious or potentially malicious) is sent from an app profiling engine 236 (e.g., which can be provided by a cloud security service, such as cloud security service 128 as shown in FIG. 1) to an update server 234 (e.g., which can also be provided by a cloud security service, such as cloud security service 128 as shown in FIG. 1). At 207, update server 234 provides updates (e.g., an updated listing of malware apps) to MDM server 226.

Host Information Profile (HIP) Reporting Process

Figure 2B:
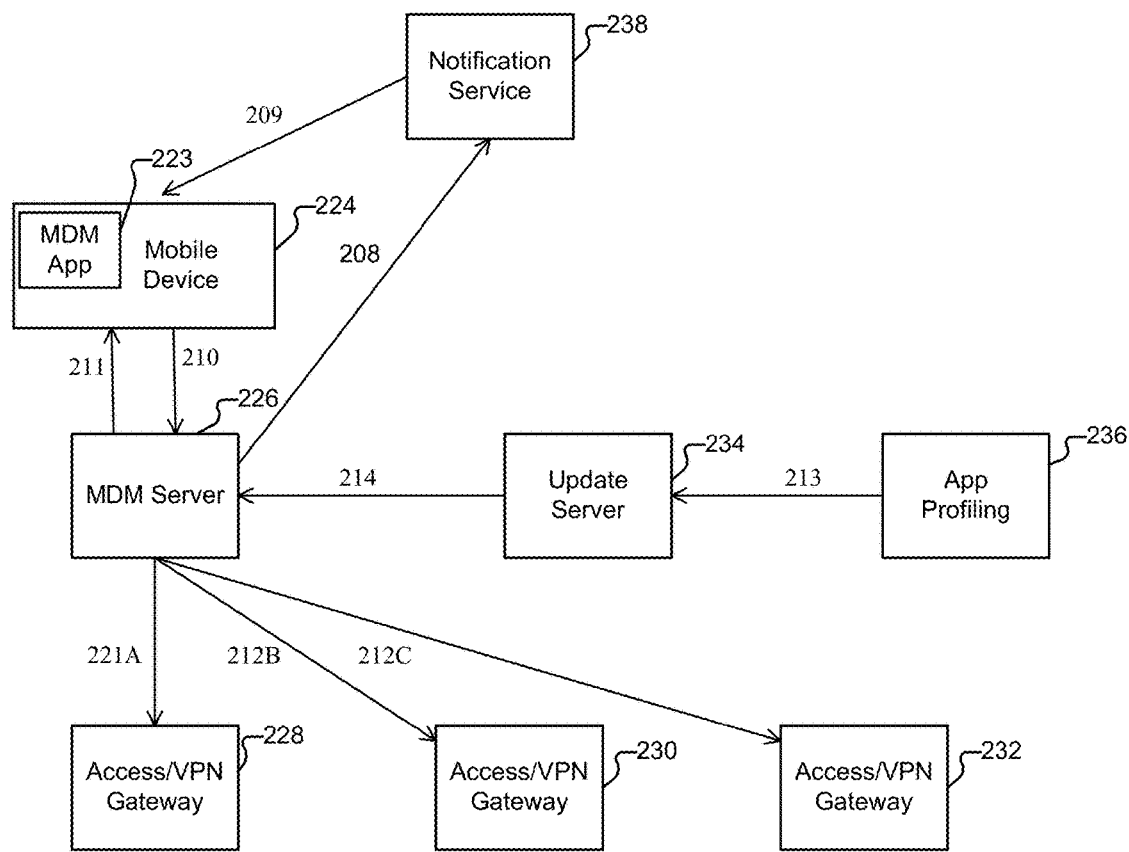
FIG. 2B is a functional diagram of a network architecture for providing Host Information Profile (HIP) reporting in accordance with some embodiments.

FIG. 2B is a functional diagram of a network architecture for providing Host Information Profile (HIP) reporting in accordance with some embodiments. At 208, MDM server 226 sends (e.g., periodically, such as every hour or at some other periodic interval, or based on an event) a push notification to a notification service 238 (e.g., Apple Push Notification Service (APNS), a Google Cloud Messaging (GCM) service, and/or another cloud notification service for mobile devices) with a request to wake managed mobile devices for check-in operations. For example, Apple APNS provides a cloud notification service that can send messages to iOS devices, and Google GCM provides a cloud notification service that can send messages to Google Play devices (e.g., Android devices). At 209, notification service 238 sends messages to managed mobile devices for check-in operations, such as to mobile device 224. At 210 and 211, mobile device 224 checks-in with MDM server 226, which can include providing updated device state information for the mobile device to the MDM server. For example, the mobile devices can provide HIP reports when performing a check-in with the MDM server and can also receive an updated policy from the MDM server.

At 212A-C, MDM server 226 sends mobile device state information (e.g., HIP reports for mobile devices) to access/VPN gateways 228, 230, and 232 (e.g., which can use the mobile device state information for applying security policies for determining access control for such mobile devices using various techniques as described herein). In some embodiments, MDM server 226 sends mobile device state information (e.g., HIP reports for mobile devices) to a data appliance (e.g., a data appliance 102 of FIG. 1, that can provide a security device, such as a firewall for the enterprise network, and/or an access/VPN gateway for the enterprise network, and which can use the mobile device state information for applying security policies for determining access control for such mobile devices using various techniques as described herein).

At 213, malware app information (e.g., a listing(s) of apps determined to be malicious or potentially malicious) are sent from an app profiling engine 236 (e.g., which can be provided by a cloud security service, such as cloud security service 128 as shown in FIG. 1) to an update server 234 (e.g., which can also be provided by a cloud security service, such as cloud security service 128 as shown in FIG. 1). At 214, update server 234 provides updates (e.g., an updated listing of malware apps) to MDM server 226.

In some embodiments, MDM server 226 is implemented as an appliance. In some embodiments, MDM server 226 provides a web-based user interface and/or a command line interface (CLI). In some embodiments, an MDM service is provided using multiple different MDM servers/appliances (e.g., which can be located in different offices, geographies, and/or be provided by one or more different vendors).

App Profiling of Apps for Mobile Devices

In some embodiments, a cloud security service executes an app profiling engine to automatically analyze apps for mobile devices. In some embodiments, a cloud security service identifies apps for analysis based on apps being available in an app store, such as Google Play, Apple's App Store, and/or other app stores. In some embodiments, the app profiling engine determines whether an app (e.g., each version of an app for each platform that the app is available for, such as for Android, iOS, and/or another mobile OS platform) is a malware app (e.g., a malicious app, a potentially malicious app, and/or otherwise violates a malware related policy based on analysis performed by the app profiling engine). In some embodiments, a cloud security service includes an update server that sends a content package that identifies malware apps (e.g., a listing of malware apps based on testing performed by the app profiling engine) to an MDM service(s). For example, such malware app listings can be updated periodically (e.g., daily, hourly, or some other interval, and/or based on an event based on a policy). The content package can include a listing of identified malware apps (e.g., information in the content package can include an app package name, an app hash code for uniquely identifying the app, and a malware name for each identified malware app). In some cases, Android apps, iOS apps, and/or other mobile device-based platform apps are supported.

Portal for Remote Access to Enterprise Network

In some embodiments, an admin can configure MDM related information in the portal's client configuration. For example, an app (e.g., an MDM secure access app, also referred to herein as an MDM app) executed on the mobile device for providing remote access to an enterprise network can automatically connect to the portal for remote access to the enterprise network and obtain a hostname and/or IP address from the downloaded configuration for mobile device enrollment and subsequent connection to an MDM service for the enterprise network.

An admin can also configure if mobile device enrollment is optional for users before connecting to the access/VPN gateway. By default, a flag can be set to false (e.g., a user would be required in such cases to complete the mobile device enrollment and stay enrolled with the MDM service in order to be permitted to connect to the access/VPN gateways for remote access to the enterprise network using the mobile device).

An admin can also have a configuration option to exclude GPS location, installed app list or other device state information from HIP data collection. Additionally, an admin can use a mobile device operating system (OS) as part of a match determination for access control configurations using the access/VPN gateways (e.g., a mobile device can receive different configurations from, for example, personal computers (PCs)). For example, an agent can be executed on a mobile device to automatically submit mobile device OS information along with user information to the portal for remote access to the enterprise network (e.g., portal) so as to receive corresponding configurations (e.g., a match for what configuration is to be delivered to such mobile device agents can include device OS along with user/user group and/or other criteria/parameters).

Host Information Profile (HIP)

In some embodiments, enrolled mobile devices send HIP data (e.g., HIP reports) to an MDM service (e.g., as part of a mobile device check-in operation). For example, a mobile device check-in operation can be initiated by sending APNS/GCM messages to the mobile devices to check-in and send HIP data to the MDM service. For iOS devices, the OS itself can send the HIP data, and, for example, limited HIP, GPS location, and jail broken status can come from the MDM app executed on the iOS devices. For Android devices, the MDM app sends the HIP data. In some embodiments, the MDM app (e.g., for Android devices) computes hashes of all installed apps and includes that information in the HIP data.

In some embodiments, HIP data (e.g., HIP reports) are sent from mobile devices to access/VPN gateways.

In some embodiments, mobile devices check-in periodically and/or based on an event(s) pursuant to a mobile device status check-in policy or a configuration setting for an enterprise. For example, if no changes exist in the HIP data, the HIP received timestamp can simply be updated.

In some embodiments, the MDM service automatically compiles HIP data for the managed devices with the cloud security service information related to malware apps to create a full HIP report for each managed mobile device. In some embodiments, the MDM service then sends the full HIP report to the access/VPN gateways. In some embodiments, the MDM service then sends the full HIP report to an access/VPN gateway only for mobile devices that have connected to that access/VPN gateway (e.g., have connected to that gateway at least once, have connected to that gateway within a predetermined interval of recent time, such as within the last week, last month, and/or some other time interval, and/or other criteria/parameters), as further discussed below with respect to various embodiments.

Access/VPN Gateway Connections

In some embodiments, only the access/VPN gateways that a mobile device connected to at least once receive HIP reports for that mobile device. For example, if there is an access/VPN gateway in the United States and Asia, and a United States-based mobile device always has connected to the United States-based access/VPN gateway, then there is generally no need for the Asia-based access/VPN gateway to have the HIP report for that United States-based mobile device.

In some embodiments, HIP data of each managed mobile device (e.g., the most current HIP report for each managed mobile device) is collected and compiled, and is made available to access/VPN gateways so the access/VPN gateways have access to the most current compiled HIP data for each of the managed mobile devices for the enterprise. In some cases, access/VPN gateways do not fetch the latest HIP data if the device did not connect to that access/VPN gateway recently (e.g., at least once in the last week, last month, and/or based on some other criteria/parameters). If the access/VPN gateways do not have the latest HIP data for a particular mobile device as that mobile device attempts to connect to the access/VPN gateway, then the access/VPN gateway can automatically request the HIP data for that mobile device connecting to the access/VPN gateway.

In some embodiments, for enterprises that are not using the mobile MDM apps but that have apps installed on the mobile devices that can provide limited HIP reports to access/VPN gateways, then such apps executed on each of the mobile devices can be configured to automatically send limited HIP (e.g., app version, OS type and version, device name, username, GPS location, jail broken/rooted status, and/or other device status related information) directly to the access/VPN gateways.

In some embodiments, for enterprises that have an MDM service (e.g., MDM server(s) that support various techniques described herein), then the MDM app executed on each of the mobile devices can be configured to automatically send certain HIP information (e.g., the jail broken/rooted status and/or other device status related information, such as critical device status information) directly to access/VPN gateways, and then access/VPN gateways can relay that information to the MDM servicer. For example, jail broken/rooted status can be critical, so it can be critical to provide that information as and when it is detected the first time to the access/VPN gateways.

For enterprises that have an MDM service (e.g., MDM server(s) that support various techniques described herein), and if a mobile device is not yet enrolled, then the MDM app executed on the mobile device can be configured to automatically send limited HIP and mobile device not enrolled status directly to access/VPN gateways.

In some embodiments, the MDM service can be configured to automatically send HIP data for managed mobile devices to one or more of the access/VPN gateways for the enterprise (e.g., to selected access/VPN gateways based on various criteria/parameter(s), such as described herein). For example, the gateways and the MDM server can mutually authenticate (e.g., verify the full certificate chain). In some embodiments, the MDM server verifies that HIP data is sent only to an authorized access/VPN gateway and not any arbitrary gateway (e.g., HIP data for mobile devices for ACME Company is only sent the gateways that belong to ACME Company and have been authorized by ACME Company).

In some embodiments, access/VPN gateways and the MDM service can uniquely identify (ID) each mobile device. For example, a unique key can be used to associate HIP data to a mobile device connecting to an access/VPN gateway.

HIP Report Content

Figure 3B:
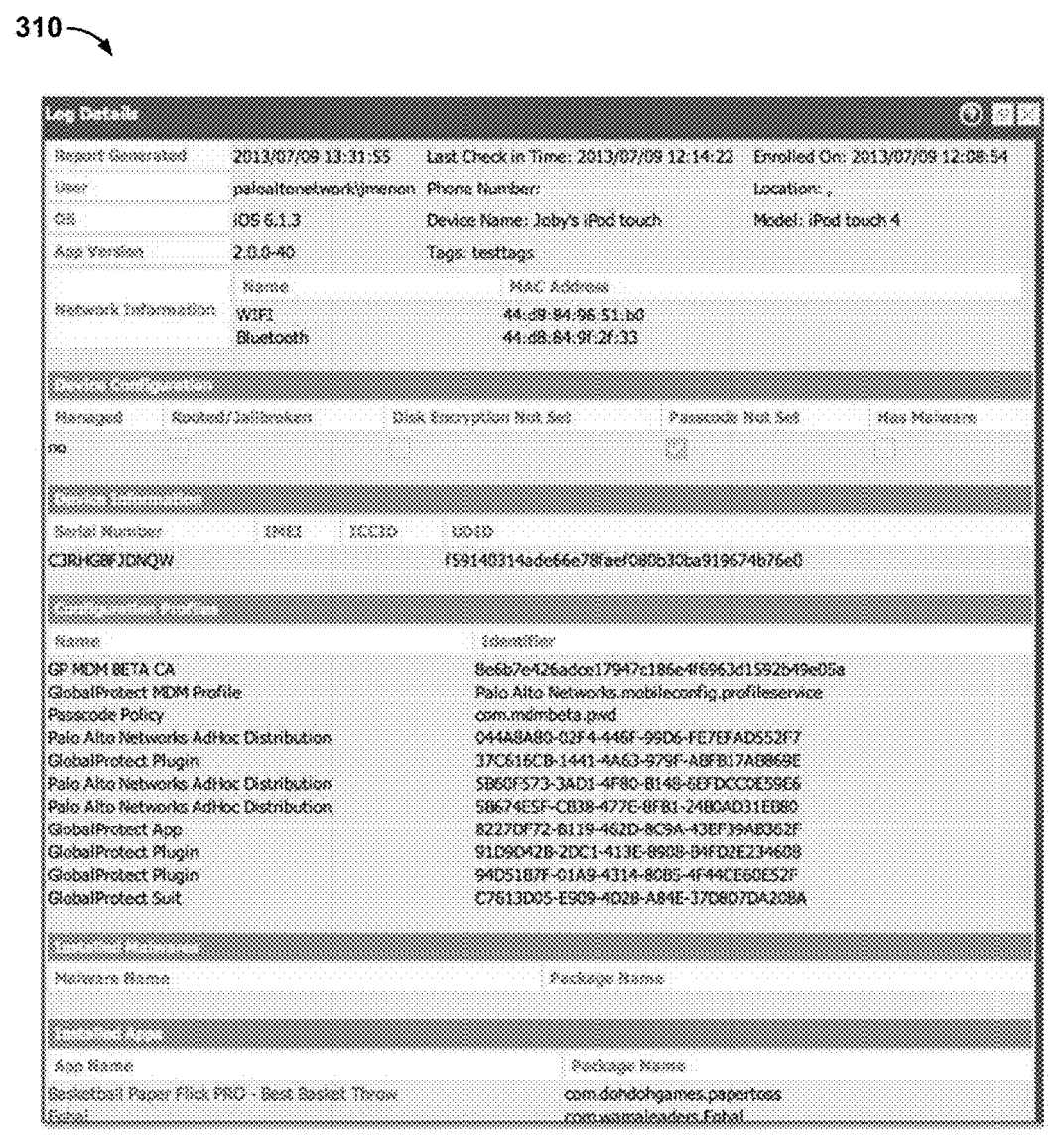

FIGS. 3A and 3B are screen shots that illustrate example Host Information Profile (HIP) reports for a mobile device in accordance with some embodiments. In particular, an example mobile device HIP report 300 is shown in FIG. 3A that provides various HIP report information for Joby's iPod including device status, device compliance, device information, and configuration profiles as shown in accordance with some embodiments. Another example mobile device HIP report 310 is shown in FIG. 3B that provides various HIP report information for Joby's iPod including touch device configuration, device information, configuration profiles, a list of any installed malware, and a list of installed apps as shown in accordance with some embodiments.

In some embodiments, a mobile device HIP report view can include various collected HIP information, such as described below. For example, the HIP report for a mobile device can include configuration profiles (e.g., name identifier configurations with associated date information), installed malware apps (e.g., list of app names associated with malware, such as Bad App-1, Bad Birds-2, and/or other malware apps, which can, for example, be identified using a cloud security service that automatically analyzes apps for malware behavior), installed apps (e.g., list of app names, such as App-1, Angry Birds-2, etc.), device related information, and/or various other information such as further described below.

In some embodiments, a mobile device HIP report includes some or all of the following information: device information, such as MDM app version, OS (e.g., OS type and version), device name, unique key, serial number, IMEI, phone number, model, UDID, ICCID, GPS Location, and/or username; device network information, such as Bluetooth, 3G/4G/LTE, Wi-Fi MAC address, and/or network over which connection was established; and list of apps installed on the device, which can include each app name, package, version, and/or if the app is malware (e.g., determined using a cloud security service that analyzes and profiles each app). For example, these attributes can facilitate providing a HIP policy match using various techniques described herein.

In some embodiments, admins define HIP objects that can be used in HIP profiles, and HIP profiles can be used in policies (e.g., access/security policies). For example, such policies can be used to configure access gateways and/or data appliances (e.g., security devices that execute firewall functions) to provide various forms of access control based on HIP profiles. On mobile devices that have malware apps installed, an admin can add exceptions for apps that the admin believes to have been misclassified. Because it is difficult to accurately uniquely identify an app, this can be triggered from a HIP report off of the app list. When a HIP object match is performed, an exception list can be evaluated. All apps in the exclude list can be excluded from the match. Any app in the include list can result in a match.

In some embodiments, a full set of content from the cloud security service (e.g., a full listing of analyzed apps) is not required to be downloaded on each access gateway (e.g., which can assist in optimizing gateway storage space utilization). In some embodiments, the access gateway uses app malware information received from the security cloud service to identify malware apps found in the enterprise.

In some embodiments, an MDM status indicates whether a mobile device is being managed by an MDM service (e.g., associated with an enterprise's MDM server using an MDM profile). In some embodiments, if a mobile device is no longer being managed, then the MDM server does not send HIP reports for that mobile device to the access gateway(s). In some cases, the gateways may continue to receive limited HIP data from the MDM app directly (e.g., the MDM app is installed and executed on the mobile device). As an example, a mobile device can enter into a state of not being managed if the user/admin configures such a change for that mobile device (e.g., removes an MDM profile to end the managed/MDM service relationship). For example, the MDM status can be used for policies (e.g., access policies), such that if the mobile device is not being managed by the MDM service, then the mobile device can be blocked from accessing enterprise resources.

In some embodiments, a HIP report includes a mobile device status. In some embodiments, a mobile device status includes a rooted/jail broken status. In some embodiments, a mobile device status includes a timestamp of when the mobile device last checked-in to the MDM service. For example, the mobile device status can be used for policies (e.g., access control/security policies), such that if a mobile device did not check-in for a number of days that exceeds a threshold setting/parameter, then the mobile device can be blocked from accessing certain or all of the enterprise resources. In some embodiments, a mobile device status includes a timestamp indicating when the mobile device enrolled in the MDM service for the enterprise. In some embodiments, a mobile device status includes a passcode status (e.g., if a passcode is set/configured for the mobile device). For example, if a passcode is not set/configured for the mobile device (e.g., or if the passcode complexity fails to satisfy an enterprise policy for passcode complexity/strength), then the mobile device can be blocked from accessing certain or all of the enterprise resources. In some embodiments, a mobile device status includes a data protection/encryption status (e.g., which can also be used in an access policy). In some embodiments, a mobile device status includes various other information, such as installed configuration profiles, installed provisioning profiles, identification of an admin(s) assigned to the mobile devices, and/or various other information that can be used to facilitate various MDM service and access policy related techniques, such as described herein with respect to various embodiments.

HIP Notification

In some embodiments, a HIP notification function is provided. For example, HIP notifications can be sent to the MDM app. In some cases, an admin can have an option to include a malware app list in the message as a mechanism to advise users of the apps that are installed on their mobile devices that were determined to be malware apps based on a policy. This approach can inform users of which app(s) caused a HIP match (e.g., for malware apps based on a policy), which also allows users an opportunity to remove/uninstall any such malware apps from their mobile device to be in compliance with the policy for the enterprise. In some embodiments, malware apps can be automatically removed from a user's mobile device (e.g., any malware apps identified can be automatically removed/uninstalled from the mobile device that is managed using an MDM service for an enterprise).

Access/VPN Gateway

In some embodiments, access/VPN gateways receive HIP reports for mobile devices from the MDM service or any other network service like a wireless access provider. For example, an access/VPN gateway can validate a server certificate for the MDM service to verify that the certificate was issued by a configured trusted Certificate Authority (CA). The access/VPN gateway can also present a client certificate for authenticating to the MDM service.

In some implementations, access/VPN gateways can be internal and behind networks not reachable, hence TCP connection initiation can be commenced by access/VPN gateways to an MDM server (e.g., and if for some reason the connection disconnects, a retry of the TCP connection initiation can be performed). For example, in a connection between an access gateway and an MDM server, a TCP connection can be initiated by the access gateway to the MDM server. This approach allows for the access gateway and the MDM server to be able to communicate even when the access gateway is not reachable from the MDM server (e.g., which can result due to NAT devices, proxies, and/or firewall rules between the access gateway and the MDM server that can make a connection to the access gateway from the MDM server impossible).

In some embodiments, access/VPN gateways used with the MDM service can require a gateway subscription (e.g., only access/VPN gateways with subscriptions can initiate a HIP request for mobile devices).

In some embodiments, a HIP object definition on access/VPN gateways is updated to have an additional mobile device category. For example, networks can be added to a configuration option. This can facilitate setting policy such that if a mobile device is connecting over a mobile 3G or 4G network, wireless, or over wired Ethernet.

In some embodiments, an MDM service or any other network service (e.g., wireless access provider) can broadcast new HIP report availability to the access/VPN gateways. For example, an access/VPN gateway can subscribe to this broadcast service and receive HIP reports for all mobile devices or only a subset of mobile devices, such as only those that connect to the access gateway frequently.

In some embodiments, multiple MDM service and multiple access/VPN gateways can participate in HIP data exchange.

In some embodiments, access/VPN gateways may also send HIP reports (e.g., jailbroken status and/or other information) to an MDM service.

Policies

In some embodiments, policies can be provided using the MDM service to manage, for example, access control for mobile devices based on such policies. For example, an admin can configure enrollment profiles (e.g., Simple Certificate Enrollment Protocol (SCEP) profiles), configuration profiles, and policies for mobile devices. Enrollment details can be captured in a device enrollment and mobile users section.

Policies can be used, for example, to determine what configurations a mobile device shall have. For example, every time a mobile device checks in with the MDM service, the MDM service can match policies (e.g., similar to security rule match in a security device, such as an appliance that applies firewall rules). In some cases, a first match can be deployed on mobile devices.

In some embodiments, an admin creates iOS configuration profiles. For example, general options can include to allow/disallow a user to remove (e.g., a locked profile) or allow to remove with a password. For example, the iOS configuration profile can also have passcode requirements (e.g., passcode complexity requirements), such as allow a simple passcode value, require an alpha numeric passcode value, require a minimum passcode length, require a minimum number of complex passcode characters, require a maximum passcode age, require auto-lock, require a passcode history, and/or require a maximum number of failed attempts. As another example, the iOS configuration profile can also include various certificates to be used for the MDM service (e.g., including certs from the certificates created on the MDM server/appliance). Also, the iOS configuration profile can indicate to the access/VPN app and VPN plug-in which portal to connect to in order to download an access/VPN configuration for enterprise access. As yet another example, the iOS configuration profile can enable VPN, enable Wi-Fi, disable a camera(s) on the mobile device, and/or perform various other mobile device configurations.

In some embodiments, an admin creates Android configuration profiles, such as similarly discussed above with respect to the iOS configuration profiles. For example, the Android configuration profiles can also have passcode requirements (e.g., passcode complexity requirements), such as allow a simple passcode value, require an alpha numeric passcode value, require a minimum passcode length, require a minimum number of complex passcode characters, require a maximum passcode age, require auto-lock, require a passcode history, and/or require a maximum number of failed attempts. As another example, the Android configuration profile can also include various certificates to be used for the MDM service (e.g., including certs from the certificates created on the MDM server/appliance). Also, the Android configuration profile can indicate to the access/VPN app and VPN plug-in which portal to connect to in order to download an access/VPN configuration for enterprise access. As yet another example, the Android configuration profile can enable VPN, enable Wi-Fi, disable a camera(s) on the mobile device, require disk encryption of the storage area on the mobile device, and/or perform various other mobile device configurations.

In some embodiments, an admin creates policies to be deployed on the mobile devices. For example, each configuration profile, such as described above, is available to be included in a user/group and HIP profile that matches a rule to be deployed. The MDM service can automatically distinguish configurations to deploy iOS configurations to iOS-based mobile devices and Android configurations to Android-based mobile devices. In some implementations, policies can be evaluated top down, and the first match can be deployed. Resulting actions can be to either install or remove a configuration, in which the MDM service can automatically install/enable or uninstall/disable a configuration from the mobile device based on what is on the device and what it should have installed/enabled. For example, if configurations A, B, and C are included in the policy and configurations A and D are present on the mobile device, then a deploy match action can automatically install/enable B and C on the mobile, and disable/uninstall D from the mobile device. In this example, the MDM service can also maintain a history of any such configuration changes for each mobile device. In some implementations, the configuration profiles can be signed with the MDM certificate and encrypted using a device identity certificate.

An example iOS configuration profile can include the following requirements and permissions:
Allow installing apps
Allow Siri
Allow Siri while locked
Allow use of camera
Allow Face Time
Allow screen capture Allow automatic syncing while roaming
Allow voice dialing
Allow In-App Purchase
Require store password for all purchases (default unchecked)
Allow multiplayer gaming
Allow adding Game Center friends
Allow use of YouTube
Allow use of iTunes Store
Allow use of Safari
Allow backup to iCloud
Allow document sync to iCloud
Allow Photo Stream to iCloud
Allow user to accept untrusted TLS certificates
allowAppRemoval
allowBookstore
allowChat
allowGameCenter
allowPassbookWhileLocked
allowSharedStream
allowSharedStreamReceiveInvitation
allowSharedStreamSendInvitation
allowUIConfigurationProfileInstallation
EnforceAssistantProfanityFilter Reporting and Logging In some embodiments, an admin can monitor logs and reports. An example report can include a predefined mobile devices summary report. In some implementations, such a predefined mobile devices summary report can be viewable on a dashboard user interface (UI) (e.g., a graphical user interface (GUI)) and/or available via a file format, such as a PDF file format that can be downloaded or exported from a reports UI section. Example reports that can be included in such summary reports include one or more of the following: 7-day daily trend graph of a number of devices that check-in at least once on a given day; 7-day daily trend graph of a number of devices managed; 7-day daily trend graph of a number of devices that did not check-in at least once on a given day; 7-day daily trend graph of a number of devices that un-enrolled; 7-day daily trend graph of a number of devices that enrolled; a breakdown of mobile device OS with device count; top five mobile device models with % split; top five Android mobile device models with device count; iOS mobile device model with device count; 7-day daily trend graph of a number of devices with malware; top five malware with infected device count; a number of devices without disk encryption; a number of devices without passcode set; a number of devices that are rooted; a number of devices that are jail broken; and a number of devices that are wiped.

Figure 4:
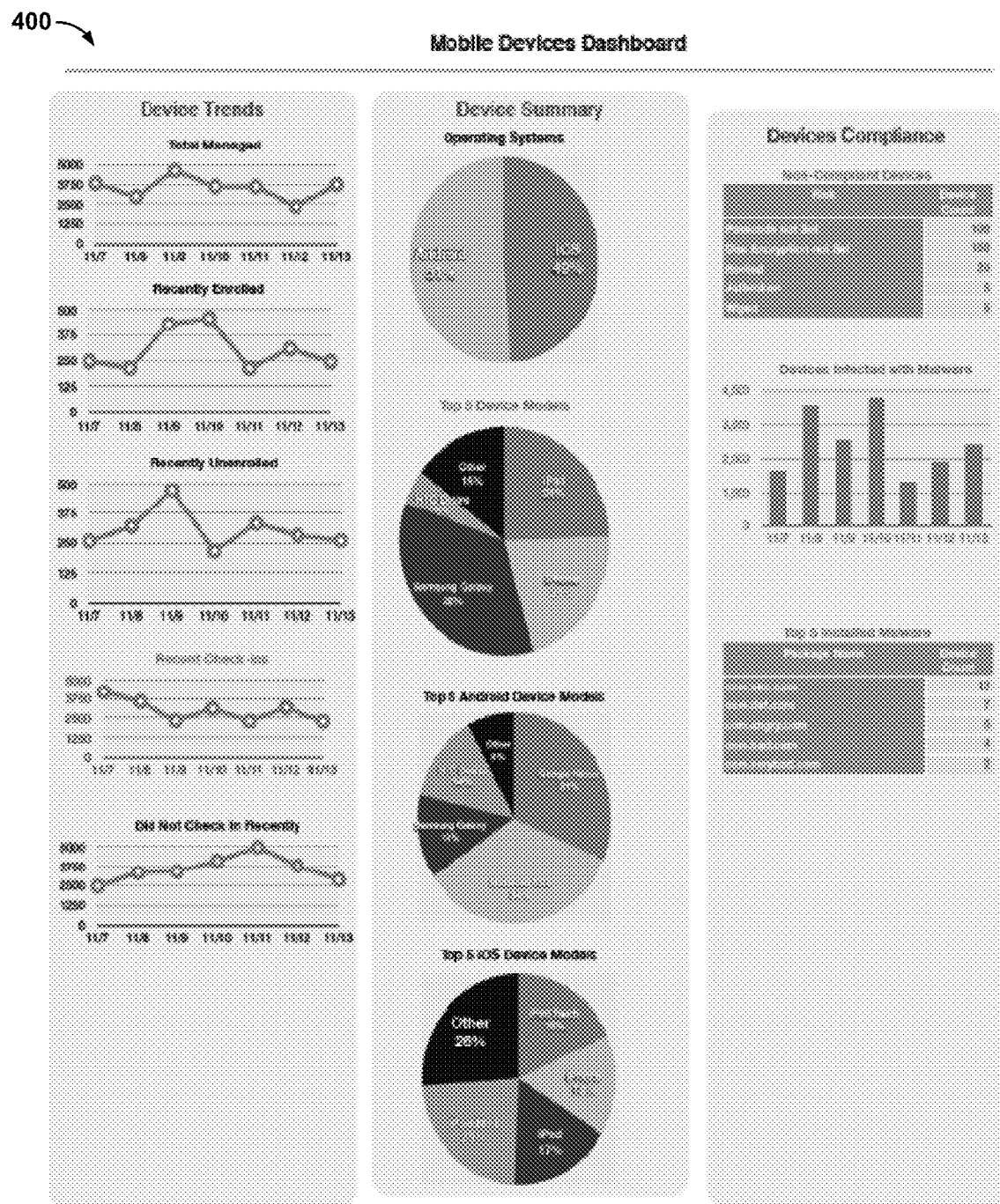
FIG. 4 illustrates an example dashboard for mobile devices security management in accordance with some embodiments.

FIG. 4 illustrates an example dashboard for mobile devices security management in accordance with some embodiments. In some embodiments, a dashboard for mobile devices security management includes device reports, apps reports, and/or custom reports that are viewable on a UI (e.g., a graphical user interface (GUI)). As shown, a mobile devices dashboard 400 includes various mobile device trends (e.g., over a predefined time period such as a week or some other time interval, a total number of mobile devices managed, a total number of recently enrolled mobile devices, a total number of mobile devices recently un-enrolled, a total number of mobile devices that have checked into the MDM service, and a total number of mobile devices that have not checked into the MDM service); a device summary (e.g., by OS, top five mobile devices, top five Android mobile devices, and top five iOS mobile devices); and devices compliance information (e.g., non-compliant devices, devices infected with malware, and a listing of the top five installed malware).

For example, an apps report can identify a list of the top 50 installed mobile apps and the least 50 installed mobile apps for each mobile device platform/OS (e.g., iOS and Android). Such an apps report can include a chart that includes various columns, such as app name, app identifier/package, and device count.

For example, a devices report for device summary can include various information regarding the managed mobile devices (e.g., a list by device model and percentage mix of that model, count of how many mobile devices are connected, did not connect, enrolled and un-enrolled). Such a devices report can also indicate device compliance information (e.g., a list by device model and count of how many of those are not encrypted, passcodes are not set, are rooted and/or jail broken, and has malware).

For example, a custom report can be generated (e.g., using a HIP match database). Such a custom report can include various columns, such as HIP, HIP type, device name, device user, device serial, receive time, day and hour. In some implementations, a custom report can be generated from a HIP report database (e.g., the following fields can be included in a HIP report: last check-in time, user, device type (model), platform, OS version, tag, device state—managed, rooted and/or jail broken, contains malware, device name, serial number, IMEI, phone number, model, UDID, ICCID, GPS location, device enrollment time, deployed policy, and/or various other fields can be provided).

Mobile Devices Managed Using the MDM Service

In some embodiments, an admin can view each of the mobile devices enrolled with the MDM service. For example, the admin can navigate to a HIP report view of the enrolled mobile devices. A default view can be presented when viewing such a HIP report view, and such a HIP report view can be customized to display certain fields by the admin (e.g., by adding and/or removing certain fields).

As another example, the admin can perform specific operational actions on the enrolled mobile device (e.g., configuration actions and/or other actions using the MDM service). The admin can select all enrolled devices or select a filtered set of devices (e.g., to an individual device from the list of mobile devices) to perform various actions (e.g., request a check-in with the MDM service, send notifications to the MDM app and iOS, collect HIP data, deploy policy, perform messaging, send a message to selected devices/users, locate the mobile device(s), remote wipe, remote lock, remote unlock, clear/reset password, un-enroll and purge all data from the selected mobile devices (which can be used for mobile devices that are lost/stolen and/or were mobile devices for employees that are no longer with the enterprise), remove all settings and policies related to the MDM service from the selected mobile devices, and/or other actions). In some implementations, admins can review a list of pending actions (if any) for mobile devices, such as actions described above.

Mobile Device Registration and Mobile Users

In some embodiments, a user of a mobile device begins a registration/enrollment process by installing an MDM app (e.g., an app for the MDM service) that can also be used to provide for secure/VPN access to an enterprise from the mobile device. For example, a user can be required to enter a username, password, and portal URL to initiate an enrollment process. The app can connect to the portal and receive a downloaded configuration file, which can also include an MDM service hostname (e.g., and/or IP address for the MDM service) and indicate whether the user must enroll with the MDM service before connecting to the access/VPN gateway or if the user may enroll and can cancel the MDM service enrollment request to proceed with the access/VPN gateway connection.

If the user must enroll with the MDM service before connecting to the access/VPN gateway, then an app plugin can prompt the user to enroll and check with MDM service if the device enrollment is complete before attempting to establish an access/VPN gateway connection. If the user may enroll, then the app can still prompt the user to enroll but the user will have the option to not enroll at that moment and connect to the access/VPN gateway. If the connection is initiated from the plugin/service, then the user will be prompted to launch the app to complete the MDM service enrollment. A server certificate for the MDM service is verified, such as described herein. The MDM service app sends an authentication request to the MDM service to begin enrollment. The MDM service authenticates the user against an authentication profile. For example, if the mobile device does not already trust the CA, then the user can be prompted to install a Certificate Authority (CA) root certificate.

For example, for iOS-based mobile devices, the user can be prompted to install a configuration profile sent by the MDM service that will request that the device send limited HIP data to the MDM service. For example, for both iOS and Android-based mobile devices, each mobile device will receive its own identity cert that belongs only to that device. The MDM service can match a device ID with the identity cert (e.g., which the MDM service can use to trust a mobile device connecting to the MDM service to ensure that it is actually communicating with the device it issued the certificate to).

At this point in the mobile device registration process, an MDM profile configuration can be installed on the mobile device. For example, configuration profiles and provisioning profiles included in a policy can be matched and pushed by the MDM service without requiring further user interaction. If include password is enabled by an admin, a username and password can be embedded into the configuration profiles for accounts before pushed out to the enrolled/registered mobile devices.

For example, a user can un-enroll from the MDM service to end the MDM service relationship by un-enrolling from the MDM service app installed on the mobile device, by removing the MDM profile (e.g., for an iOS device), or by removing device admin privileged for the MDM service app. The un-enrollment process can include automatically removing all profiles installed by the MDM service. If a mobile device is un-enrolled, then the MDM service can mark that mobile device as not being managed by the MDM service. In some cases, such mobile devices can still be configured to send limited HIP data to the MDM service if the mobile device is still registered with the service. A user can enroll the mobile device again by selecting enroll from the mobile device to get managed again by the MDM service. In some cases, a data appliance or security/access gateway or any other network device that can execute a firewall is configured to apply a different policy (e.g., firewall/security policy) to a mobile device that has been un-enrolled (e.g., is no longer enrolled) by the MDM service.

Mobile Devices Check-in

In some embodiments, the MDM service communicates with enrolled/managed mobile devices via a cloud messaging service (e.g., an APNS cloud messaging service for Apple iOS-based mobile devices and/or GCM cloud messaging service for Android-based mobile devices).

For example, mobile devices can check-in with the MDM service to obtain policy and report HIP data. Example check-in scenarios include the following: scheduled (e.g., wake mobile devices via APNS/GCM push notification as configured to check-in); default (e.g., periodic check-in requirements every 1 hour, every 24 hours, and/or some other default check-in requirement setting); event trigger (e.g., if the mobile device is detected by the MDM app to have been jail broken or rooted that can be an event trigger requiring that the mobile device perform a check-in operation with the MDM service and/or access/VPN gateways); and/or manual check-in request (e.g., an admin can send a message to mobile devices to check-in and submit HIP information).

In some embodiments, if the MDM service determines that a mobile device needs to receive a new policy, then the MDM service sends a message to the mobile device to check-in so that the new policy can be sent to the mobile device. For example, if a deployed policy is changed by the admin and committed, then all mobile devices that received that policy earlier can receive a check-in message.

Figure 5:
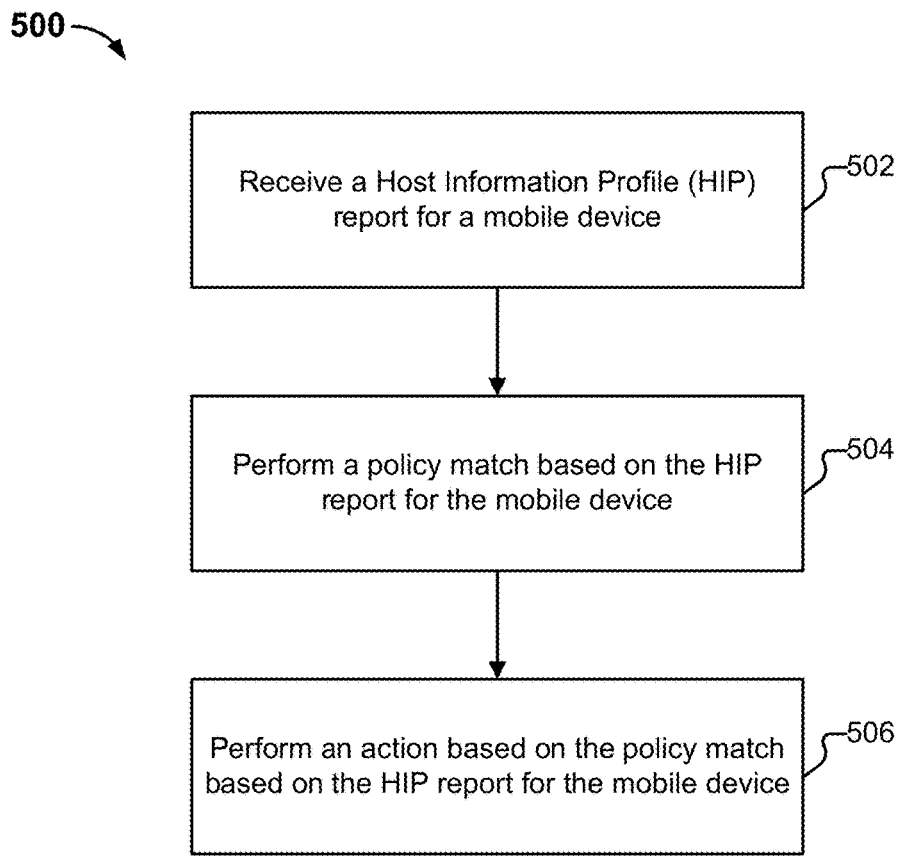
FIG. 5 is a flow diagram for performing policy enforcement at an access gateway based on a device state of a mobile device in accordance with some embodiments.

FIG. 5 is a flow diagram 500 for performing policy enforcement at an access gateway based on a device state of a mobile device in accordance with some embodiments. At 502, receive a Host Information Profile (HIP) report for a mobile device is performed. At 504, performing a policy match based on the HIP report for the mobile device is performed. At 506, performing an action based on the policy match based on the HIP report for the mobile device is performed. In some embodiments, automatically configuring mobile devices and applying policy based on device state further includes receiving a list of known malware and application characteristics from an external service. For example, the policy match can be determined based on a user/group match and/or a device match. An example action can include allowing or denying network access to a mobile device based on a mobile device state (e.g., malware app installed on the mobile device, disk encryption not enabled on the mobile device, and/or some other mobile device state based on a policy match).

Figure 6:
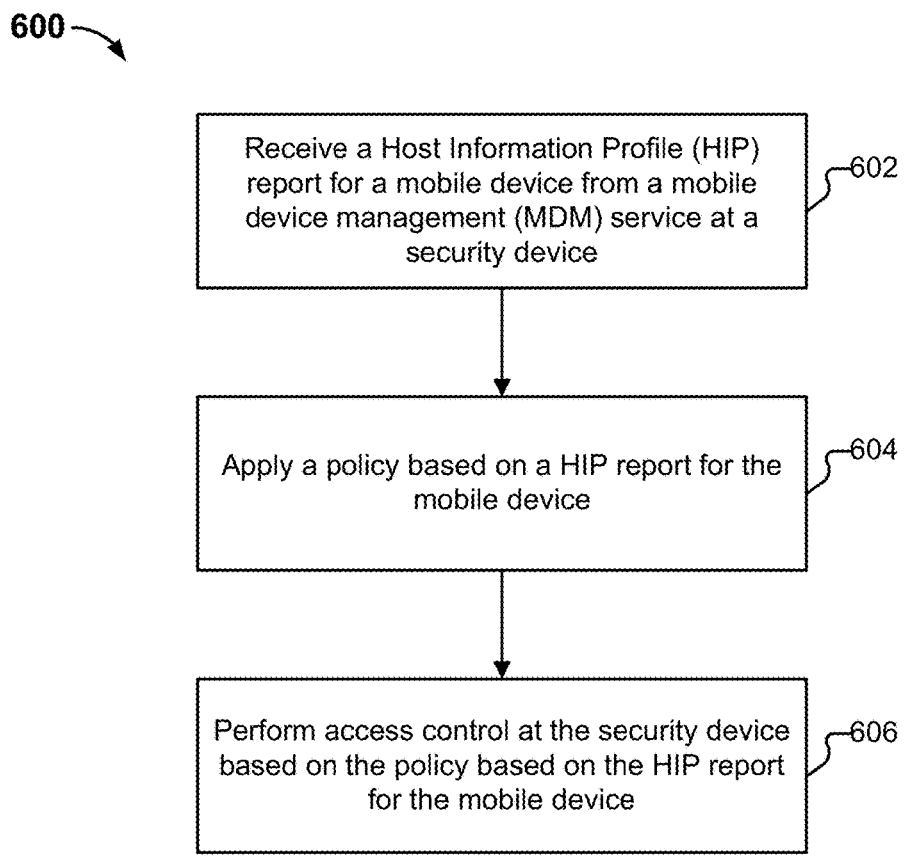
FIG. 6 is a flow diagram for performing policy enforcement at a security device based on a device state of a mobile device in accordance with some embodiments.

FIG. 6 is a flow diagram 600 for performing policy enforcement at a security device based on a device state of a mobile device in accordance with some embodiments. At 602, device state information for a mobile device from a mobile device management (MDM) service at a security device is received. At 604, applying a policy based on a Host Information Profile (HIP) for the mobile device and the device state is performed. At 606, performing access control at the security device based on the policy based on the HIP for the mobile device and the device state is performed. For example, the action can be an access control related action performed by an access gateway and/or security device (e.g., a firewall appliance) to control access to enterprise network resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for a security device that provides network-based security for mobile devices based on device state, comprising:
 a processor configured to:
  receive a Host Information Profile (HIP) report for a mobile device from a mobile device management (MDM) service at the security device, wherein the HIP report includes device state information for the mobile device, and wherein the HIP report for the mobile device includes configuration information of the mobile device, the configuration information of the mobile device including a list of installed malware apps;

apply a policy based on the HIP report for the mobile device, comprising to:

compare a first app included in the list of installed malware apps with a second app in an exclude list; and in the event that the first app included in the list of installed malware apps matches with the second app in the exclude list, omit applying the policy; and perform access control at the security device based on the policy based on the HIP report for the mobile device; and a memory coupled to the processor and configured to provide the processor with instructions.

2. The system recited in claim 1, wherein the security device includes a firewall.

3. The system recited in claim 1, wherein the security device comprises an access gateway.

4. The system recited in claim 1, wherein the HIP report for the mobile device further includes one or more of the following device state information: a type of the mobile device and software installed on the mobile device.

5. The system recited in claim 1, wherein performing access control at the security device based on the policy based on the HIP report for the mobile device includes allowing access to an enterprise resource.

6. The system recited in claim 1, wherein performing access control at the security device based on the policy based on the HIP report for the mobile device includes denying access to an enterprise network.

7. The system recited in claim 1, wherein performing access control at the security device based on the policy based on the HIP report for the mobile device includes allowing restricted access to an enterprise network.

8. A method for a security device that provides network-based security for mobile devices based on device state, comprising:

receiving a Host Information Profile (HIP) report for a mobile device from a mobile device management (MDM) service at the security device, wherein the HIP report includes device state information for the mobile device, and wherein the HIP report for the mobile device includes configuration information of the mobile device, the configuration information of the mobile device including a list of installed malware apps;

applying a policy based on the HIP report for the mobile device; device, comprising:

comparing a first app included in the list of installed malware apps with a second app in an exclude list; and in the event that the first app included in the list of installed malware apps matches with the second app in the exclude list, omitting applying the policy; and performing access control at the security device based on the policy based on the HIP report for the mobile device.

9. The method recited in claim 8, wherein the security device includes a firewall.

10. The method recited in claim 8, wherein the security device comprises an access gateway.

11. The method recited in claim 8, wherein the HIP report for the mobile device further includes one or more of the following device state information: a type of the mobile device and software installed on the mobile device.

12. The method recited in claim 8, wherein performing access control at the security device based on the policy based on the HIP report for the mobile device includes allowing access to an enterprise resource.

13. The method recited in claim 8, wherein performing access control at the security device based on the policy based on the HIP report for the mobile device includes denying access to an enterprise network.

14. The method recited in claim 8, wherein performing access control at the security device based on the policy based on the HIP report for the mobile device includes allowing restricted access to an enterprise network.

15. A computer program product for a security device that provides network-based security for mobile devices based on device state, the computer program product being embodied in a tangible non-transitory computer readable storage medium and comprising computer instructions for:

receiving a Host Information Profile (HIP) report for a mobile device from a mobile device management (MDM) service at the security device, wherein the HIP report includes device state information for the mobile device, and wherein the HIP report for the mobile device includes configuration information of the mobile device, the configuration information of the mobile device including a list of installed malware apps;

applying a policy based on the HIP report for the mobile device, comprising:

comparing a first app included in the list of installed malware apps with a second app in an exclude list; and in the event that the first app included in the list of installed malware apps matches with the second app in the exclude list, omitting applying the policy; and performing access control at the security device based on the policy based on the HIP report for the mobile device.

16. The computer program product recited in claim 15, wherein the security device includes a firewall.

17. The computer program product recited in claim 15, wherein the security device comprises an access gateway.

18. The computer program product recited in claim 15, wherein the HIP report for the mobile device further includes one or more of the following device state information: a type of the mobile device and software installed on the mobile device.

19. The computer program product recited in claim 15, wherein performing access control at the security device based on the policy based on the HIP report for the mobile device includes allowing access to an enterprise resource.

20. The computer program product recited in claim 15, wherein performing access control at the security device based on the policy based on the HIP report for the mobile device includes denying access to an enterprise network or allowing restricted access to the enterprise network.

21. The system recited in claim 1, wherein the list of installed malware apps is identified by a cloud security service.

* * * * *